(12) United States Patent
Sakai et al.

(10) Patent No.: US 10,802,266 B1
(45) Date of Patent: Oct. 13, 2020

(54) ELECTROWETTING ELEMENT WITH PROTRUSION

(71) Applicant: Amazon Technologies, Inc., Seattle, WA (US)

(72) Inventors: Toru Sakai, Eindhoven (NL); Robert Andrew Hayes, Hong Kong (HK); Karel Johannes Gerhardus Hinnen, Eindhoven (NL); Tulasi Sridhar Reddy Guntaka, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 415 days.

(21) Appl. No.: 15/711,744

(22) Filed: Sep. 21, 2017

(51) Int. Cl.
G02B 26/00 (2006.01)
G09G 3/34 (2006.01)
(Continued)

(52) U.S. Cl.
CPC ............ G02B 26/005 (2013.01); *B29C 66/21* (2013.01); *B29C 66/43* (2013.01); *B29C 66/73* (2013.01);
(Continued)

(58) Field of Classification Search
CPC .... G02B 26/004; G02B 26/005; G02B 26/02; G02B 26/023; G02B 2207/115; G02B 5/201; G02B 5/20; G02B 26/00; G09G 3/348; G09G 3/3433; G09G 2300/0426; G09G 2300/0421; B32B 37/0076; B32B 37/0084; B32B 2307/20; B32B 2307/204; B32B 2307/40; B32B 2307/412; B32B 2307/41; B32B 2307/73; B32B 2457/20; B29C 65/00; B29C 65/05; B29C 65/20; B29C 65/21; B29C 65/40; B29C 65/41; B29C 65/43; B29C 65/47; B29C 65/472; B29C 65/474; B29C 64/00; B29C 64/10;
(Continued)

(56) References Cited

U.S. PATENT DOCUMENTS

2009/0169806 A1* 7/2009 Lo .......................... G02B 26/005
428/119
2009/0284824 A1* 11/2009 Feenstra .............. G02B 26/004
359/291

(Continued)

FOREIGN PATENT DOCUMENTS

WO 2009133079 A1 11/2009
WO 2013087858 A1 6/2013

*Primary Examiner* — Philip C Tucker
*Assistant Examiner* — Brian R Slawski
(74) *Attorney, Agent, or Firm* — EIP US LLP

(57) ABSTRACT

An electrowetting element comprising a first fluid, a second fluid immiscible with the first fluid, a first electrode, a second electrode in contact with the second fluid and a first and second support plate. The first support plate comprises the first electrode and a surface. The second support plate comprises a protrusion which overlaps a first surface portion of the surface and which, with a first voltage with a substantially zero magnitude applied between the first electrode and the second electrode, contacts the second fluid without substantially contacting the first fluid. Upon application of a second voltage with a non-zero magnitude between the first electrode and the second electrode, the first fluid moves such that there is substantially no contact between the first fluid and the first surface portion.

20 Claims, 6 Drawing Sheets

(51) Int. Cl.
*B32B 37/00* (2006.01)
*B29C 65/00* (2006.01)

(52) U.S. Cl.
CPC ......... *B32B 37/00* (2013.01); *B32B 2307/204* (2013.01); *B32B 2307/41* (2013.01); *B32B 2307/412* (2013.01); *B32B 2307/73* (2013.01); *B32B 2457/20* (2013.01); *G09G 3/348* (2013.01)

(58) Field of Classification Search
CPC ... B29C 64/106; B29C 64/124; B29C 64/129; B29C 64/135
USPC .......... 359/290, 291, 295, 227; 427/58, 162; 345/84, 211, 212; 156/60, 145, 156, 182, 156/272.2, 273.3, 273.9, 275.5, 292, 297; 264/1.1, 1.36, 1.38; 430/321, 325; 428/119, 120, 156
See application file for complete search history.

(56) References Cited

U.S. PATENT DOCUMENTS

| | | | | |
|---|---|---|---|---|
| 2010/0321760 A1* | 12/2010 | Hayes | ................ | G02B 26/005 359/290 |
| 2012/0098812 A1* | 4/2012 | Bae | ...................... | G02B 26/005 345/211 |
| 2013/0021661 A1* | 1/2013 | Baek | .................... | G02B 26/005 359/290 |
| 2013/0208331 A1* | 8/2013 | Kim | ...................... | G02B 26/02 359/228 |
| 2013/0301105 A1* | 11/2013 | Kim | ...................... | G02B 26/005 359/290 |
| 2013/0342889 A1* | 12/2013 | Kim | ...................... | G02B 26/005 359/290 |
| 2014/0016178 A1* | 1/2014 | Rosser | ................. | G02B 26/005 359/290 |
| 2014/0029080 A1* | 1/2014 | Hwang | ................ | G02B 26/005 359/290 |
| 2014/0036341 A1* | 2/2014 | Kwon | .................. | G02B 26/005 359/290 |
| 2014/0293395 A1* | 10/2014 | Hendriks | ............. | G02B 26/005 359/290 |
| 2014/0355102 A1* | 12/2014 | Lee | ........................ | G02B 5/201 359/290 |
| 2016/0178888 A1* | 6/2016 | Massard | ............. | G02B 26/005 359/290 |
| 2016/0259160 A1* | 9/2016 | Hsiao | ..................... | G02B 26/02 |

\* cited by examiner

ELECTROWETTING ELEMENT WITH PROTRUSION

BACKGROUND

Electrowetting display devices are known. In an off state of a known electrowetting element an oil layer covers a display area. In an on state the oil layer is retracted so as to cover less of the display area. To switch the electrowetting element to the on state a voltage is applied via an electrically conductive fluid immiscible with the oil. To switch the electrowetting element to the off state, the voltage is switched off. By switching the oil and the electrically conductive fluid to different fluid configurations, different optical states can be displayed by the electrowetting element.

It is known to control the movement of the oil and the electrically conductive fluid to reduce the appearance of visible display artifacts. It is, however, desirable to further improve fluid motion control in an electrowetting element.

SUMMARY

According to a first aspect, an electrowetting element is provided. The element includes a first fluid, a second fluid immiscible with the first fluid, and a first support plate including a first electrode and a surface. The element further includes a second electrode in contact with the second fluid and a second support plate including a protrusion which overlaps a first surface portion of the surface and which, with a first voltage applied between the first electrode and the second electrode, contacts the second fluid without substantially contacting the first fluid, the first voltage having a substantially zero magnitude. The first fluid and the second fluid are located between the first support plate and the second support plate. Upon application of a second voltage between the first electrode and the second electrode, the second voltage having a non-zero magnitude, the first fluid moves such that there is substantially no contact between the first fluid and the first surface portion.

According to a second aspect, an electrowetting element is provided. The element includes a first fluid, a second fluid immiscible with the first fluid, and a first support plate including a first electrode and a first surface. The element further includes a second electrode in contact with the second fluid and a second support plate including a first layer with an extent which overlaps a first surface portion of the first surface. The first surface portion is less than all of the first surface. The first layer is substantially transmissive to light of at least one wavelength in the visible spectrum. The element further includes a second layer including a material which overlaps a second surface portion of the first surface, different from the first surface portion. The material is configured to substantially prevent at least a portion of light of the at least one wavelength in the visible spectrum from transmission through the material. The first layer is closer to the first surface than the second layer such that the second support plate has a non-planar second surface which overlaps the first surface. The first fluid and the second fluid are located between the first support plate and the second support plate. The first fluid is switchable between a first configuration with the first fluid in contact with the first surface portion, with a first voltage applied between the first electrode and the second electrode, the first voltage having a substantially zero magnitude, and a second configuration substantially without the first fluid in contact with the first surface portion and with the first fluid at least partly overlapped by the material, with a second voltage applied between the first electrode and the second electrode, the second voltage having a non-zero magnitude.

According to a third aspect, an apparatus is provided. The apparatus includes an electrowetting element. The element includes a first fluid, a second fluid immiscible with the first fluid, and a first support plate including a first electrode and a surface. The element includes a second electrode in contact with the second fluid and a second support plate including a protrusion which overlaps a first surface portion of the surface and which contacts the second fluid without contacting the first fluid with a first voltage applied between the first electrode and the second electrode. The first voltage has a substantially zero magnitude. The first fluid and the second fluid are located between the first support plate and the second support plate. The element further includes at least one processor and at least one memory including computer program instructions, the at least one memory and the computer program instructions operable to, with the at least one processor, apply a second voltage between the first electrode and the second electrode, the second voltage having a non-zero magnitude, to move the first fluid such that there is substantially no contact between the first fluid and the first surface portion.

DETAILED DESCRIPTION

Examples are described below of an electrowetting element comprising a first fluid and a second fluid immiscible with the first fluid. The electrowetting element has a first support plate comprising a first electrode and a surface and a second support plate comprising a protrusion which overlaps a first surface portion of the surface. The protrusion is for example a bank, step, ridge or protuberance of the second support plate that protrudes or juts out compared to another portion of the second support plate. For example, the second support plate may have a non-planar surface due to the protrusion.

With a first voltage applied between the first electrode and a second electrode in contact with the second fluid, the first voltage having a substantially zero magnitude, the protrusion contacts the second fluid without substantially contacting the first fluid. In other words, a layer of the second fluid is between the protrusion and a layer of the first fluid. A portion of the second fluid underneath the protrusion (for example between the protrusion and the first fluid) is for example thinner than a different portion of the second fluid between a second support plate portion free from the protrusion and the first fluid.

A Laplace pressure is, for example, lower beneath the protrusion than elsewhere. For example, a pressure difference between the thinner portion of the second fluid and a portion of the first fluid between the thinner portion of the second fluid and the first support plate is lower than a pressure difference between the different portion of the second fluid and a further portion of the first fluid between the different portion of the second fluid and the first support plate. This for example causes the first fluid to move such that there is substantially no contact between the first fluid and the first surface portion upon application of a second voltage with a non-zero magnitude, for example upon a change from application of the first voltage to application of the second voltage. For example, movement or motion of the first fluid may initiate between the protrusion and the first surface portion of the surface (which is overlapped by the protrusion). In this way, the motion of the first fluid can be controlled to begin beneath the protrusion, so that the first fluid retracts away from the protrusion.

Figure 1:
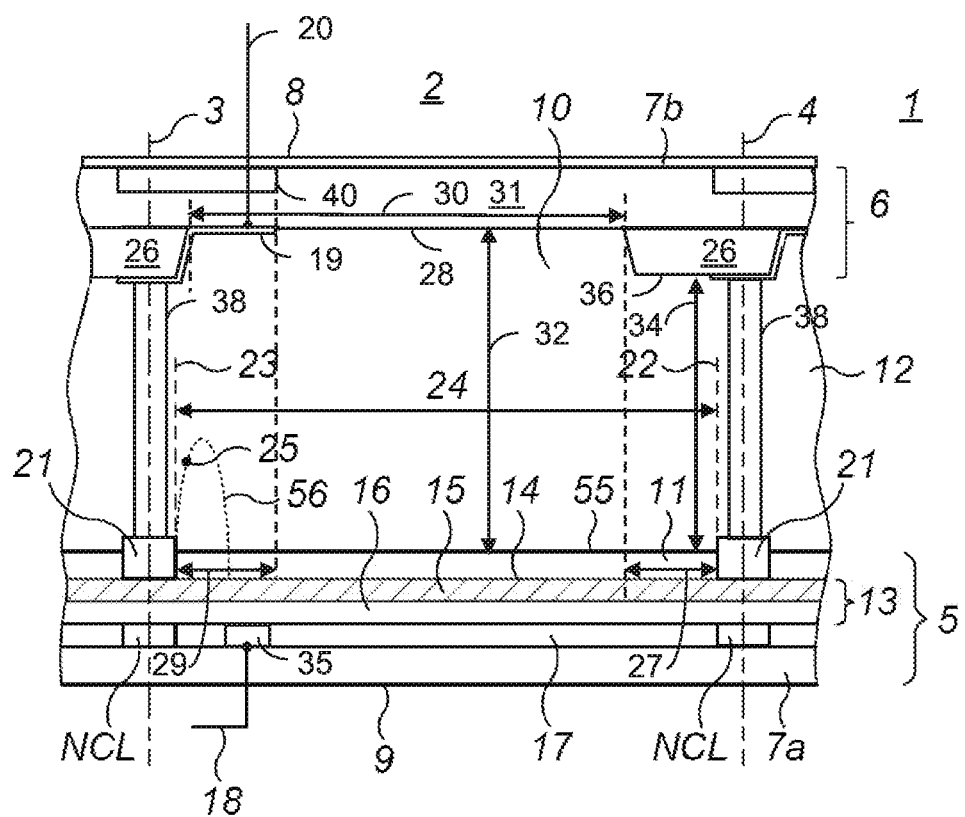
FIG. 1 shows schematically an electrowetting element in cross-section according to examples.

FIG. 1 shows a diagrammatic cross-section of part of an example of an electrowetting display device 1, which may be referred to as a display device. The electrowetting display device 1 includes a plurality of electrowetting elements 2, which may otherwise for example be referred to as picture elements, display elements or electrowetting cells, one of which is shown in the Figure. The lateral extent of the electrowetting element 2 is indicated in FIG. 1 by two dashed lines 3, 4. The electrowetting element 2 comprises a first support plate 5 and a second support plate 6. The first and second support plates 5, 6 may be separate parts of each electrowetting element or the first and second support plates 5, 6 may instead be shared in common by the plurality of electrowetting elements. The first support plate 5 and the second support plate 6 may include first and second substrates 7a, 7b, which may be made of glass or polymer. One or both of the first and second support plates 5, 6 may be rigid or flexible.

The electrowetting display device 1 has a viewing side 8 on which an image or display effect formed by the electrowetting display device can be viewed and a rear side 9. In the Figure a side of the first support plate 5 corresponds with the rear side 9 and a side of the second support plate 6 corresponds with the viewing side 8. Alternatively, in other examples, a side of the first support plate may correspond with the viewing side. The electrowetting display device may be of the reflective, transmissive or transflective type. The electrowetting display device may be an active matrix driven display device. The plurality of electrowetting elements may be monochrome. For a color electrowetting display device the electrowetting elements may be divided in groups, each group having a different color; alternatively, an individual electrowetting element may be able to show different colors.

A first fluid 11 and a second fluid 12 are located between the first support plate 5 and the second support plate 6, in a space 10 between the first support plate 5 and the second support plate 6, sometimes referred to as a cavity. In the example of FIG. 1, each electrowetting element 2 includes a respective portion of the first fluid 11 and the second fluid 12 is shared by the array of electrowetting elements. However, in other examples, each electrowetting element may include an individual or separate portion of the second fluid, for example where the second fluid is not shared by the array of electrowetting elements. At least one of the first and second fluids may be a liquid. The second fluid is immiscible with the first fluid in examples such as that of FIG. 1. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids at least partially meet, for example contact, each other at an interface labelled 55 in FIG. 1 for when no voltage is applied and labelled 56 for when a voltage is applied, which interface typically corresponds to a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water, or a salt solution such as a solution of potassium chloride in water. In examples, the second fluid is polar and in some examples is electrically conductive, but in other examples is not electrically conductive. Electrically conductive typically refers to a second fluid capable of conducting electricity for example. For example an electrical current may flow through the second fluid due to the flow of ions through the second fluid. In examples, a polar fluid, such as a polar second fluid, includes at least one compound (for example a liquid vehicle) having a molecule with a net dipole. Thus, across the molecular structure the molecule may have an overall dipole moment, due to an electron distribution, with at least one part of the molecule having a negative electrical charge and at least one different part of the molecule having a positive electrical charge. Such dipole moments may include permanent dipoles. The polarity is caused for example by the presence of one or more atom to atom bonds in the molecule, with for example one of the atoms being a heteroatom such as oxygen or nitrogen. For example, such a polar atom to atom bond is a bond between an oxygen (O) atom and a hydrogen (H) atom, i.e. an —O—H bond. The second fluid may be transparent.

The first fluid is typically electrically non-conductive and may for instance be an alkane like hexadecane or may be an oil such as silicone oil. The first fluid is therefore non-polar in at least some examples.

The first fluid may absorb at least a part of the optical spectrum. The first fluid may be transmissive for a part of the optical spectrum, forming a color filter. For example, the first fluid may be another color than black and absorb a part of the optical spectrum, for example a sub-range of wavelengths within the visible spectrum. For this purpose the first fluid may be colored by addition of pigment particles or a dye. The electrowetting display device may include electrowetting elements having first fluids which are respectively red, green or blue, or cyan, magenta and yellow to provide a full color display. Alternatively, the first fluid may be black, for example absorb substantially all parts of the visible spectrum, or reflective. A reflective first fluid may reflect the entire visible spectrum, making the layer appear white, or part of it, making it have a color. Typically, by absorbing substantially all parts of the optical or visible spectrum, there is nonetheless a degree of variation, therefore the first fluid may not absorb all wavelengths, but the majority of wavelengths within a given spectrum such as the visible spectrum, so as to perform the function of the first fluid in the electrowetting element. The first fluid may therefore be configured to absorb substantially all light incident on the first fluid. For example the first fluid may absorb 90% or more of light in the visible spectrum and incident on the first fluid.

The first support plate 5 includes an insulating layer 13. The insulating layer 13 may be transparent or reflective. The insulating layer 13 may extend between walls 21 of an electrowetting element 2. To avoid short circuits between the second fluid 12 and electrodes arranged under the insulating layer, layers of the insulating layer may extend uninterrupted over a plurality of electrowetting elements 2, as shown in FIG. 1. The insulating layer has a surface 14 facing the space 10 of the electrowetting element 2. In this example the surface 14 is hydrophobic, although in other examples the surface may have different wettability properties or may include a hydrophobic portion and a hydrophilic or less hydrophobic portion. The thickness of the insulating layer may be less than 2 micrometers and may be less than 1 micrometer. The surface 14 is in contact with at least one of the first fluid or the second fluid, depending on the fluid configuration as described below.

The insulating layer may be a hydrophobic layer; alternatively, it may include a hydrophobic layer 15 and a dielectric layer 16 with predetermined dielectric properties, the hydrophobic layer 15 facing or closer to the space 10, as shown in FIG. 1 The hydrophobic layer 15 is schematically illustrated in FIG. 1 and may be formed of Teflon® AF1600. The dielectric layer 16 may have a thickness, taken in a direction perpendicular to a plane of the substrate 7a, of between 5 nanometers and several micrometers, for example between 50 nanometers and 2 micrometers or 3 micrometers. In other examples the thickness may be between 50 nanometers and 500 nanometers. The dielectric layer may be made of an inorganic material like silicon oxide or silicon nitride or stack of alternating organic and inorganic layers.

The hydrophobic character of the surface 14 causes the first fluid 11 to adhere preferentially to the insulating layer 13, since the first fluid 11 has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

The first fluid 11 in this example is substantially confined to an electrowetting element by at least one wall 21 that follows the cross-section of the electrowetting element. For example, the first fluid 11 may remain within the electrowetting element 2 within operational tolerances. In such cases, a relatively small amount of the first fluid 11 may nevertheless transfer to an adjacent or neighboring electrowetting element, for example by spilling over a wall 21 due to an impact on the first or second support plate 5, 6 or another shock, which may compress the first and second fluids 11, 12 and cause the first fluid 11 to be expelled from the electrowetting element 2. The amount of first fluid 11 that transfers in this way is generally sufficiently small to avoid adversely affecting the display quality or the contrast of the electrowetting element 2. The extent of the electrowetting element 2, indicated by the dashed lines 3 and 4, is taken between the center of the walls 21. The surface 14 between the walls of an electrowetting element, indicated by the dashed lines 22 and 23, is called the display area 24, over which a display effect occurs. Thus, the surface 14 may be considered to be at least partly surrounded by a wall 21. In examples such as FIG. 1, the at least one wall (in this case, the walls 21) correspond to a perimeter of the surface 14, as can be seen further in FIG. 2 (described below).

In examples, the walls 21 may extend from the first support plate 5 to the second support plate 6, or the walls may extend only partly from the first support plate 5 to the second support plate 6 as shown in FIG. 1, or partly or fully from the second support plate 6 to the first support plate 5. Although the walls 21 are shown as structures protruding from the insulating layer 13 in the example of FIG. 1, in other examples the walls may instead be formed by a surface layer of the support plate that acts as a boundary to retain the first fluid 11 by repelling the first fluid 11. For example, walls 21 may be formed by providing a portion of the surface 14 with a substantially different wettability. For example, the walls may include a hydrophilic or less hydrophobic layer. In further examples, the walls may include any combination of materials, including materials that extend away from the first support plate and surface layers with a substantially different wettability than a portion of the display area 24.

The walls 21 may be a plurality of separate structures, for example that are adjoining, in contact with each other or sufficiently close to substantially confine the first fluid 11 with the electrowetting element 2. In other examples, though, the walls 21 may form a single substantially continuous (for example continuous within manufacturing tolerances) or continuous structure per electrowetting element 2 or across a portion or the entirety of the electrowetting display device 1.

An electrowetting element 2 in examples such as that of FIG. 1 includes at least one electrode as part of the first support plate 5. In the example of FIG. 1, the first support plate 5 of the electrowetting element 2 includes a first electrode 17, although the first support plate of other electrowetting elements may include more than one first electrode per electrowetting element.

The first electrode 17 may be reflective for light of at least one wavelength, for example at least one wavelength in the visible spectrum. For example, the first electrode 17 may be reflective for light of substantially all wavelengths in the visible spectrum, for example a majority or all wavelengths in the visible spectrum or a sufficiently large number of wavelengths to operate as a reflector in a reflective electrowetting element 2. Alternatively, the first electrode 17 may be reflective for light of a predetermined range of wavelengths in the visible spectrum, such as a range of wavelengths corresponding to a particular color, to create a colored display effect by reflection of light from the first electrode 17.

In cases in which the first electrode 17 is reflective, the first electrode 17 may be arranged to reflect light of the at least one wavelength from incident light incident on the first electrode 17 after transmission through the second support plate 6. A reflective surface of the first electrode 17 may therefore face the second support plate 6 or the viewing side 8 of the electrowetting element 2 to receive ambient light entering the electrowetting element 2 from an external environment.

In other examples, such as examples in which the electrowetting element 2 is arranged for transmissive operation, the first electrode 17 may be transmissive for light of substantially all wavelengths in the visible spectrum. In yet further examples, such as examples in which the electrowetting element 2 is a transflective electrowetting element, the first electrode 17 may have a first portion that is reflective for light of at least one wavelength, such as substantially all wavelengths in the visible spectrum and a second portion that is transmissive for light of at least one wavelength, such as substantially all wavelengths in the visible spectrum.

The first electrode 17 is electrically insulated from the first and second fluids 11, 12 by the insulating layer 13 in the example of FIG. 1. In some examples, further layers may be arranged between the insulating layer 13 and the first electrode 17. The first electrode 17 of the electrowetting element 2 of FIG. 1 is separated from first electrodes of the first support plate 5 of neighboring electrowetting elements by an electrically non-conductive layer NCL in FIG. 1.

The first electrode 17 can be of any desired shape or form, and may be made of the transparent conductive material indium tin oxide (ITO). The first electrode 17 is supplied with voltage signals by a first signal line 18, schematically indicated in FIG. 1.

A second signal line 20 is connected to a second electrode 19 that is in electrical contact with the second fluid 12. Similarly to the first electrode 17, the second electrode 19 may be made of ITO. In the example of FIG. 1, there is a second electrode 19 for each electrowetting element 2. However, in other examples, there may be fewer than one second electrode 19 per electrowetting element. For example, the second electrode may be common to all electrowetting elements, for example when they are fluidly interconnected by and share the second fluid 12, uninterrupted by walls.

In the example of FIG. 1, the second support plate 5 comprises the second electrode 19, although in other examples, the second electrode 19 may be positioned in a different location.

The electrowetting element 2 can be controlled by a voltage V applied between the first and second signal lines 18 and 20 and hence between the first electrode 17 and the second electrode 19 (or between the first electrode 17 and the second fluid 12 in examples in which a plurality of electrowetting elements share the same second electrode). The voltage V may be considered to be a voltage applied to the electrowetting element 2.

The first electrode 17 may be coupled to a display driving system. For example, in an electrowetting display device having the electrowetting elements arranged in a matrix form, the first electrode 17 can be coupled to a matrix of control lines on the substrate 7a via the first signal line 18. Thus, as will be appreciated by the skilled person, the first support plate 5 may include further electronic or electrical components not illustrated in FIG. 1 that form part of the display driving system. For example, the first support plate 5 may include a switchable element 35 such as a transistor, for example a thin-film transistor (TFT), or a diode for use in controlling a potential applied to the first electrode 17. In the example of FIG. 1, the switchable element 35 is shown schematically as being in the same layer as the first electrode 17. However, this is merely illustrative. In other examples, the switchable element 35 may be in one or more different layers from that of the first electrode 17. For example, components or parts of the switchable element 35 (such as a TFT), may be located beneath or in a separate or different layer from the first electrode 17. In such cases, there may be an insulating layer between the switchable element 35 and the first electrode 17 and the first electrode 17 may be connected to the switchable element 35 through a contact hole (sometimes referred to as a "via") that passes through the insulating layer. For example, a drain terminal of a TFT may be connected to the electrode 17 through the contact hole. The second signal line 20 may also be coupled to the display driving system or to a separate or different display driving system.

A display effect provided by the electrowetting element 2 may depend on an extent that the first fluid 11 and the second fluid 12 adjoin or contact the surface 14 corresponding with the display area 24, in dependence on the magnitude of the applied voltage V described above. The magnitude of the applied voltage V therefore determines the configuration of the first and second fluids 11, 12 within the electrowetting element 2. In other words, the display effect depends on the configuration of the first and second fluids 11, 12 in the electrowetting element 2, which configuration depends on the magnitude of the voltage applied between the first and second electrodes 17, 19 of the electrowetting element 2. For example, for controlling the configuration of the first and second fluids 11, 12, a constant potential may be applied to the second electrode 19 and the magnitude of a potential applied to the first electrode 17 may be controlled (or vice versa). The display effect gives rise to a display state of the electrowetting element 2 for an observer looking at the electrowetting display device 1. When switching the electrowetting element 2 from one fluid configuration to a different fluid configuration the extent of second fluid 12 adjoining the surface 14 may increase or decrease, with the extent of first fluid 11 adjoining the surface 14 decreasing or increasing, respectively. Thus, the display effect may in effect be controlled by controlling a configuration of the first fluid 11 (and consequently the second fluid 12).

In examples described herein, when a first voltage with a zero or substantially zero magnitude is applied between the first electrode 17 and the second electrode 19, for example when the electrowetting element 2 is in an off state, the first fluid 11 forms a layer between the walls, as shown in FIG. 1 with the reference numeral 55. Typically, substantially zero in examples refers to a voltage with a magnitude which is minimal, for example as close to zero that the first fluid adjoins a maximum extent of the surface 14. Application of a second voltage with a non-zero magnitude will retract the first fluid, for example against a wall as shown by the dashed shape 56 in FIG. 1. The controllable shape of the first fluid 11, in dependence on the magnitude of the applied voltage, is used to operate the electrowetting element to provide a display effect over the display area 24, which in this example corresponds with the surface 14 bounded by the walls 21. For example, switching the first and second fluids 11, 12 to increase adjoinment of the second fluid 12 with the surface 14 may increase the brightness of the display effect provided by the electrowetting element 2.

This display effect determines the display state of the electrowetting element 2 which an observer will see when looking towards the viewing side of the electrowetting display device 1. The electrowetting display device 1 is typically capable of providing display states from black to white, including various intermediate grey states; in a color electrowetting display device, the available display states may also include color.

In the example of FIG. 1, the second support plate 6 includes a protrusion 26, which may be used to control fluid motion, for example by determining an initiation location at which motion of the first fluid begins upon changing the voltage applied to the electrowetting element 2 from the first voltage (which is a substantially zero voltage) to the second voltage (which is a non-zero voltage). As explained above, the protrusion 26 is for example a bank, step, ridge or protuberance of the second support plate that protrudes or juts out compared to a second support plate portion of the second support plate 6 free from the protrusion 26. The protrusion 26 typically protrudes into the space 10 of the electrowetting element 2, so that an extremity or most protruding point or region of the protrusion 26 is closer to the surface 14 than a second surface of the second support plate portion of the second support plate 6 free from the protrusion 26. However, the protrusion 26 may be between at least two layers of the second support plate 6. For example, the protrusion 26 may be located between the second electrode 19 and the substrate 7b. In other examples, though, a protrusion surface of the protrusion 26 may correspond with a surface of the second support plate 6. For example, the protrusion surface may be in contact with the second fluid 12 of the electrowetting element.

The protrusion 26 overlaps a first surface portion of the surface 14, an extent of which is labelled with the reference numeral 27 in FIG. 1. With the protrusion 26 overlapping the first surface portion, the protrusion 26 for example covers, extends over, lies over or has an extent that corresponds with the first surface portion but in a different but parallel plane. The first surface portion of the surface 14 is for example less than all of the surface 14.

In FIG. 1, the protrusion 26 is a layer located on other layers of the second support plate with a width less than a width of the electrowetting element 2. Hence, the protrusion 26 extends closer towards the surface 14 of the first support plate 5 (which may be referred to as a first surface 14) than a second surface 28 of a second support plate portion of the second support plate that is free from the protrusion 26. In other words, the second surface 28 is for example the surface of the lateral extent of the second support plate that does not include the protrusion 26. A width 30 of the second surface 28 is illustrated schematically in FIG. 1.

In the example of FIG. 1, the second surface 28 includes part of a surface of the substrate 7b and part of a surface of the second electrode 19. However, in other examples, the second surface 28 may include different surfaces. For example, where the second electrode 19 extends across the width of the electrowetting element 2, the second surface 28 may correspond with the surface of the second electrode 19. In such examples, the surface of the substrate 7b may not be in contact with the second fluid 12.

The second surface 28 for example overlaps a different surface portion of the surface 14 than the first surface portion of the surface 14 overlapped by the protrusion 26. In other words, the surface 14 includes two different portions: one overlapped by the protrusion 26 and one not overlapped by the protrusion 26. As will be explained further below, in examples, initiation of motion of the first fluid 11 begins between the protrusion and the first surface portion of the surface 14, at what may be considered to be an initiation location overlapped by the protrusion 26. The first fluid 11 then retracts to cease contacting the first surface portion of the surface 14.

In FIG. 1, a height of the protrusion 26 (for example taken in a vertical direction in FIG. 1, or a direction perpendicular to the surface 14) is not shown to scale, for clarity. For example, the protrusion 26 may have a height of at least 50% or more than 50% of an inter-support-plate spacing (such as a distance between the surface 14 of the first support plate 5 and the second surface 28 of the second support plate 6), which is sometimes referred to as a cell gap. In such cases, there is a first distance 32 in a first direction perpendicular to the surface 14 between the surface 14 and the second surface 28 and a second distance 34, in a second direction perpendicular to the surface 14, between the surface 14 and a third surface 36 of the protrusion closest to the surface 14. For example, the first direction may be parallel to the second direction. In these examples, the second distance 34 may be 50% or less than 50% of the first distance 32. For example, with a cell gap or first distance 32 of twenty-five micrometers within measurement uncertainties, the height of the protrusion 26 or the second distance 34 may be twenty micrometers within measurement uncertainties.

With this height of the protrusion 26, a portion of the second fluid 12 between the third surface 36 of the protrusion 26 and the surface 14 may have a relatively small thickness or a relatively large difference in thickness compared with a different portion of the second fluid 12 between the second surface 28 of the second support plate 6 and the surface 14. For example, a distance ratio between the second distance 34 and the first distance 32 may meet or be less than a threshold distance ratio for movement of the first fluid 11 to initiate between the protrusion 26 and the first surface portion upon application of the second voltage. In other words, the protrusion 26 may be sufficiently large compared with the cell gap of the electrowetting element 2. The threshold distance ratio may therefore be satisfied by distance ratios that are sufficiently small (in other words, for protrusions 26 that are sufficiently high compared to the cell gap) for the protrusion 26 to cause or determine a location at which motion of the first fluid 11 initiates. It may be determined whether a protrusion 26 has a distance ratio that meets or is less than the threshold distance ratio by analyzing or measuring whether motion of the first fluid 11 consistently initiates at an initiation location between the protrusion 26 and the first surface portion, for example for a plurality of electrowetting elements 2 with the same distance ratio. If not, the distance ratio may be exceeded.

With the first voltage applied between the first electrode and the second electrode, a second portion of the second fluid 12 between a first portion of the first fluid 11 and the protrusion 26 may have a first height in a first direction perpendicular to the surface 14 and a fourth portion of the second fluid 12 between a third portion of the first fluid 11 and a second support plate portion of the second support plate free from the protrusion 26 may have a second height, larger than the first height, in a second direction perpendicular to the surface 14. For example, the second direction may be parallel to the first direction. There may therefore be a first pressure difference between the first portion of the first fluid 11 and the second portion of the second fluid 12 located between the first support plate 5 and the protrusion 26 and a second pressure difference between the third portion of the first fluid 11 and the fourth portion of the second fluid 12 in contact with the third portion of the first fluid 11, the third portion and the fourth portion located between the first support plate and the second support plate portion free from the protrusion. The first pressure difference may be considered to be a first Laplace pressure and the second pressure difference may be considered to be a second Laplace pressure. A first magnitude of the first pressure difference may be larger than a second magnitude of the second pressure difference. With the first magnitude larger than the second magnitude, the protrusion 26 may therefore cause the first fluid to move such that there is substantially no contact between the first fluid 11 and the first surface portion. For example, motion of the first fluid 11 may initiate between the protrusion and the first surface portion, for example so that motion of the first portion of the first fluid 11 initiates before motion of the third portion of the first fluid 11, upon changing the voltage applied from the first voltage to the second voltage. In this way, the difference in Laplace pressure may be used to control or determine movement of the first fluid 11, and may be used to control a location or position of fluid motion initiation.

This difference in Laplace pressure may also be used to determine a direction of fluid motion. For example, due to the protrusion 26, motion of the first fluid 11 may initiate between the protrusion and the first surface portion, for example at an initiation location overlapped by the protrusion 26, to switch the first fluid 11 from a first configuration with the first fluid 11 in contact with the first surface portion of the surface 14 overlapped by the protrusion 26, with the first voltage applied, to a second configuration substantially without the first fluid 11 in contact with the first surface portion, with the second voltage applied. For example, a negligible amount or quantity of the first fluid 11 may contact with the first surface portion with the second voltage applied. For example, the first fluid 11 may be in contact with zero, zero within measurement uncertainties or less than 10% of the first surface portion. In such cases, the first configuration may correspond to the configuration of the first fluid 11 labelled 55 in FIG. 1 and the second configuration may correspond to the configuration of the first fluid 11 labelled 56 in FIG. 1. For example, in the first configuration, the first fluid 11 may contact part or all of the second surface 28. The first fluid 11 may therefore be retracted away from a wall 21 overlapped by the protrusion 26 towards an opposite wall 21 of the electrowetting element 2. This can be seen in the example of FIG. 1, in which the first fluid 11 in the first configuration 11 is retracted to the left side of the electrowetting element 2, whereas the protrusion 26 is located along the right side of the electrowetting element 2.

The motion of the first fluid 11 that initiates between the protrusion and the first surface portion upon changing the voltage applied to the electrowetting element 2 from the first voltage to the second voltage may be a major, primary or substantial initiation of the first fluid 11. For example, motion of a larger proportion of the first fluid may initiate between the protrusion and the first surface portion than in a different region of the electrowetting element 2. There may therefore be other minor or secondary initiation points or regions at which motion of smaller quantities of the first fluid 11 initiate, such as what may be considered to be satellite portions of the first fluid 11 that are distinct from or that separate from a bulk or larger portion of the first fluid 11.

The motion of the first fluid 11 may initiate in various different positions or locations between the protrusion 26 and the first surface portion. For example, the motion of the first fluid 11 may initiate at a point or area along a boundary or meniscus between the first fluid 11 and the second fluid 12 contacts or meets the wall 21 beneath the protrusion 26. For example, movement of the first fluid may begin along a length or extent of an inner surface of the wall 21 that is within the electrowetting element 2, for example along all or part of a wall 21 corresponding to a side of the electrowetting element 2 and overlapped by the protrusion 26. Alternatively, the motion of the first fluid 11 may initiate at a point or area where the meniscus between the first and second fluids 11, 12 contacts the first surface portion (for example, if the meniscus does not contact or meet the wall 21). In yet further examples, the motion of the first fluid 11 may begin or start at other points, areas or regions along the meniscus between the first and second fluids 11, 12 that are nevertheless beneath the protrusion 26. Such other points, areas or regions may be away from or not in contact with the wall 21 and the first surface portion. In still further examples, the first fluid 11 may begin to move within an interior of the first fluid 11 itself rather than at a surface of the first fluid 11. The precise location at which the motion of the first fluid 11 initiates beneath the protrusion 26 typically depends on various structural features of the electrowetting element 2, such as the shape of the at least one wall 21 and the protrusion 26, as well as wettability and chemical properties of components of the electrowetting element 2 such as the at least one wall 21, the protrusion 26, the first surface portion and the first and second fluids 11, 12.

By locating the protrusion 26 in the second support plate 6 and using the protrusion 26 to control fluid motion initiation, the first support plate 5 may not include components or elements for fluid motion control. For example, the surface 14 of the first support plate 5 may be substantially planar, for example planar within manufacturing tolerances. Manufacture of the first support plate 5 may therefore be more straightforward than in other examples in which the first support plate 5 includes fluid motion control components, the profile, dimensions and relative position of which must typically be precisely controlled with respect to other components of the first support plate 5 (such as the at least one wall 21) in order to obtain the desired control of fluid motion.

In addition, an inner face of a wall 21 may be angled with respect to the surface 14 at an angle that is more acute (for example smaller or closer to 90 degrees) than if the surface of the first support plate 5 is non-planar or uneven. The angle between the inner face of the wall 21 may be considered to correspond to the angle a profile or an inner side of the wall 21 makes with the surface 14 (within the electrowetting element 2). The profile of the wall 21 may not be straight, though. For example, the wall 21 may have a curved cross-section. In such cases, this angle may be measured where the wall 21 meets the surface 14, within the electrowetting element 2. In other cases, though, this angle may be taken between an average plane of the inner face of the wall 21 (for example, the face or side of the wall that faces or is in contact with the first fluid 11 and/or the second fluid 12 of the electrowetting element 2) and a plane of the surface 14.

Typically, a smaller angle between the inner face of a wall 21 and the surface 14 decreases the adherence between the first fluid 11 and the wall 21. Thus, when an electric field is applied to the electrowetting element 2 by application of a non-zero voltage between the first and second electrodes 17, 19, the first fluid 11 will tend to move away from the wall 21. The control of the initiation of motion of the first fluid 11 upon application of the non-zero voltage to the electrowetting element 2 may therefore be improved compared with other examples in which the inner face of the wall 21 meets the surface 14 at a gentle slope or at a large or obtuse angle.

Angling the inner face of the wall 21 at a sufficiently small angle with respect to the surface 14 (for example, with an interior angle between the inner face of the wall 21 and the surface 14 for contacting the first fluid 11 of less than 110 degrees, less than 100 degrees, less than 90 degrees, or less than 80 degrees) may also allow the first fluid 11 to be deposited in the electrowetting elements 2 of the electrowetting display device 1 with a more uniform thickness, for example with a smaller variation in first fluid thickness between different electrowetting elements 2. This is for example because the first fluid 11 may adhere or be pinned to the inner surface or face of the wall 21 to a greater extent with a smaller angle between the inner face of the wall 21 and the surface 14. For example, there may be enhanced wetting between the first fluid 11 and an interface between the wall 21 and the surface 14. For example, the first fluid 11 may tend to adhere to or contact the bottom of the wall 21, where the wall 21 meets the surface 14, due to capillary action. This may reduce the likelihood of overfilling electrowetting elements with the first fluid 11 during manufacture or during operation of the electrowetting display device 1, as the first fluid 11 tends to remain in contact with the bottom of the wall 21. This may therefore make it easier to manufacture electrowetting elements with a more homogeneous thickness of first fluid 11.

The first fluid 11 may, however, meet the wall 21 with a curved or parabolic profile in cross-section rather than the flat profile shown in FIG. 1 due to surface tension at the three-phase line between the first fluid 11, the second fluid 12 and the wall 21. For example, if the wall 21 is hydrophilic, it may be more energetically favorable for the second fluid 12 to contact the wall 21 than the first fluid 11. The second fluid 12 may therefore partially displace the first fluid 11 close to the wall 21. This may therefore lead to a thickness of the first fluid 11 that is smaller for portions of the first fluid 11 closer to the wall 21 than for other portions of the first fluid 11 (such as a central portion of the first fluid 11 that contacts a central point or region of the surface 14).

An electrowetting element 2 with a substantially planar first support plate 5 may also exhibit smoother motion of the first fluid 11 after initiation. For example, the first fluid 11 may move across the surface 14 without getting pinned or trapped in recesses of the surface 14 that may be present in a non-planar surface. This may improve the display quality of the electrowetting element 2.

Moreover, with a substantially planar surface 14, a height of the first fluid 11 may also be substantially uniform or constant or more uniform than examples in which the surface 14 is uneven or non-planar. In examples in which the first fluid 11 absorbs at least a portion of visible light, the contrast of the electrowetting element 2 may therefore be increased compared with an electrowetting element with a non-uniform height of the first fluid 11. For example, in such cases, the non-uniform height of the first fluid 11 may lead to relatively thin portions of the first fluid 11 that may absorb a smaller proportion of light from a backlight of the electrowetting element 2 (for a transmissive electrowetting display device) or ambient light incident on the electrowetting element 2 (for a reflective electrowetting display device) than intended. This may therefore lead to an off state of the electrowetting element 2 that is lighter than desired (for example dark grey rather than black), reducing the contrast of the electrowetting element 2. It is to be noted that even where the first fluid 11 has a curved profile in cross-section (for example due to surface tension factors described above), a thickness of the first fluid 11 adjacent or close to the wall 21 (for example at a thinnest portion of the first fluid 11) is typically larger than the thinnest portion of the first fluid 11 in examples with a non-planar first support plate 5.

Although in FIG. 1 the protrusion 26 is shown as a single layer, in other examples the protrusion may include a plurality of layers of different materials. The protrusion 26 typically includes a photoresist material to allow for simple manufacture of the protrusion. For example, the photoresist material may be an acrylate-based photoresist. A first refractive index of a material of the protrusion 26 may be equal to or less than 10% different from a second refractive index of the second fluid 12. For example, the first refractive index may be substantially equal to the second refractive index, such as equal to the second refractive index within measurement uncertainties. As an example, the first refractive index may be around 1.42 within measurement uncertainties and the second refractive index may be 1.44 or 1.45 within measurement uncertainties. With the first refractive index similar to the second refractive index, the protrusion 26 may be less visible or not clearly visible to an observer of the electrowetting display device 1. This may therefore reduce or avoid a reduction in display contrast that may occur if the protrusion 26 is visible to a viewer.

In the example of FIG. 1, the electrowetting element 2 includes a spacer 38 located between the protrusion 26 and the wall 21. The spacer 38 for example reduces displacement of the first and second support plates 5, 6 relative to each other and may thus increase the robustness of the electrowetting display device 1. This may therefore reduce unwanted effects such as the so-called lowered ceiling effect, in which the first fluid 11 may adhere to the second support plate 6 if the distance between the first and second support plates 5, 6 becomes small enough. This may also reduce the so-called tsunami effect, in which, if a pressure pulse is exerted on the second support plate 6, a shock wave may be created that may cause the first fluid 11 to flow over a wall 21.

A first width of the spacer 38 in a first direction parallel to the surface 14 may be less than a second width of the protrusion 26 in a second direction parallel to the first direction. FIG. 1 shows such an example. In FIG. 1, the spacer 38 is narrower than the protrusion 26. The difference between the first width of the spacer 38 and the second width of the protrusion 26 may facilitate or improve the ability of the spacer 38 and the protrusion 26 to perform their respective functions. For example, the second width of the protrusion 26 may be larger than the first width of the spacer 38 for the protrusion 26 to provide sufficient control of the initiation location of the first fluid motion. Conversely, the first width of the spacer 38 may be smaller than the second width of the protrusion 26 to allow the spacer 38 to be more easily aligned with the wall 21 rather than the surface 14 (as contact between the spacer 38 and the surface 14 can reduce the display quality).

The protrusion 26 may be off-center or misaligned with at least one of the spacer 38 or the wall 21. For example, the protrusion 26 may overlap at least part of the wall 21 and a first axis which passes through a center of the protrusion 26 in a direction perpendicular to the surface 14 may be spaced from a second axis which passes through a center of the wall in the direction perpendicular to the surface. In this way, the protrusion 26 may overlap the first surface portion of the surface 14 in the electrowetting element 2 without substantially overlapping a surface of the first support plate 5, for example corresponding to a display area, for a neighboring electrowetting element.

In examples such as that of FIG. 1, the protrusion 26 is a first layer with an extent which overlaps a first surface portion of the surface 14 (which may be considered to be a first surface). The first surface portion of the surface 14 therefore has the extent labelled with the reference numeral 27 in FIG. 1. In these examples, the first surface portion is less than all of the first surface. In other words, the protrusion 26 partly overlaps the display area 24 without fully or entirely overlapping the display area 24. The first layer may be substantially transmissive to light of at least one wavelength in the visible spectrum, for example sufficiently transmissive to the light of the at least one wavelength to avoid unduly reducing the display contrast, such that the electrowetting element 2 can function as a display element.

In these examples, the second support plate 6 may also include a second layer comprising a material which overlaps a second surface portion of the first surface, different from the first surface portion. An extent (in this case, a width) of the second surface portion is labelled with the reference numeral 29 in FIG. 1. In the example of FIG. 1, the second layer may be considered to be a layer 31, which includes a material 40. In FIG. 1, the layer 31 is an overcoat or cover layer, which is arranged to separate the material 40 from the first and second fluids 11, 12. The layer 31 may for example be formed of or include a resin such as an acrylate resin. In other examples, though, the second layer may be the second substrate 7b. In such cases, the substrate 7b may include the material 40.

The material 40 is configured to substantially prevent at least a portion of light of the at least one wavelength in the visible spectrum from transmission through the material. For example, the material 40 may prevent all or all within manufacturing tolerances or at least 90% of the portion of light of the at least one wavelength in the visible spectrum from transmission. As the skilled person will understand, the visible spectrum typically corresponds to radiation with a wavelength of between 380 nanometers to 700 nanometers. For example, the material may be a black material, such as a black photoresist. For example, the material 40 may include carbon black or carbon powder dispersed in a photoresist. The material may be part of a so-called black matrix or black mask structure or layer. The material may have a stripe pattern in plan view, for example as a series of parallel stripes or bands that each correspond with an edge or a side of a row or column of electrowetting elements. For example, the material may overlap a side wall and/or a second surface portion of a plurality of electrowetting elements of the same row or column. In other examples, the material may have a grid pattern in plan view. For example, the material may overlap the walls of the electrowetting elements, which may also form a grid pattern. In such cases, the material may have an asymmetric pattern. For example, the material may have thicker columns than rows or vice versa.

In other examples, the material 40 is configured to substantially prevent at least a portion of electromagnetic radiation of at least one wavelength in the non-visible electromagnetic spectrum from transmission through the material. For example, the material 40 may be configured to substantially prevent at least a portion of ultraviolet radiation, such as electromagnetic radiation with a wavelength of between 100 nanometers and 380 nanometers, from transmission.

In the example of FIG. 1, the material does not overlap the surface of an electrowetting element to the left of the electrowetting element 2 illustrated (which is for example in the same row but a neighboring column of a matrix of electrowetting elements). In other examples, however, the material may overlap both the second surface portion of the first surface and a further surface portion of a first surface of an electrowetting element in a neighboring column. For example, the material may continuously overlap the second surface portion, the wall 21 and the further surface portion. In such cases, the material may also overlap the further surface portion of other electrowetting elements in the neighboring column but in a different row to the electrowetting element 2. For example, the material may have the shape of a stripe that is wider than the width of the wall and the width of the second surface portion, so that the material overlaps the further surface portion in addition to overlapping the wall and the second surface portion of the electrowetting element 2.

The first layer may be closer to the first surface than the second layer such that the second support plate 6 has a non-planar second surface which overlaps the first surface. As explained above, the non-planarity of the second surface may be used to determine an initiation location for initiation of motion of the first fluid 11 upon switching from applying the first voltage to applying the second voltage between the first electrode 17 and the second electrode 19.

With the protrusion 26 overlapping the first surface portion and the material 40 overlapping the second surface portion, the material 40 may therefore overlap a different portion of the surface than the first surface portion including the initiation location. For example, the second surface portion may correspond to a portion of the surface 14 contacted by the first fluid 11 when in the second configuration, with the second voltage applied. For example, the first fluid 11 may be at least partly, substantially or entirely overlapped by the material 40 with the second voltage applied. By substantially preventing at least a portion of visible light from transmission through the material 40, the material 40 may for example be used to reduce or prevent bleaching of a dye of the first fluid 11 by protecting the first fluid 11 from contact by the light when in the first fluid 11 is in a retracted configuration such as the second configuration.

In examples such as FIG. 1, the material may also overlap at least part of a switchable element of the first support plate. Such as a switchable element is for example a TFT for switching the electrowetting element 2 between display states. In general, a TFT has at least a gate terminal, a source terminal, a drain terminal and a semiconducting channel. Generally, the gate terminal, source terminal and drain terminal are formed of a conductive material, such as a metal. The channel, on the other hand, may generally be formed of a semiconducting material that may be absorbent of light and which may cause a photocurrent in the TFT. This can affect performance of the electrowetting element 2. For example, the photocurrent can cause cross-talk, e.g., capacitive, inductive, or conductive coupling from one part of the electrowetting element 2 to another, between adjacent electrowetting elements or between the electrowetting element and other components within the electrowetting display device 1, such as other control circuitry.

In the example of FIG. 1, the material 40 overlaps the entirety of the switchable element 35. By overlapping the switchable element 35, the material 40 may be used to prevent or reduce incidence of electromagnetic radiation, such as visible light or ultraviolet radiation, on the switchable element 35. Thus, the material 40 may act as a light shield for the switchable element 35, such as a TFT. This may therefore reduce a photocurrent in the TFT, avoiding or reducing a reduction in performance of the electrowetting element 2.

The second surface portion overlapped by the material 40 may be a relatively small portion of the surface 14, for example less than 30%, 25%, 20% or 15% of the surface 14, so as to avoid unduly reducing the contrast of the electrowetting element 2. However, the extent of the material 40, and hence the extent of the second surface portion, may be sufficient to cover or obscure components of the electrowetting element 2 that may otherwise adversely affect the display effect of the electrowetting element 2 if not obscured, such as control circuitry for controlling the electrowetting element 2.

The second electrode 19 may be substantially entirely overlapped by the material 40. For example, at least 80%, at least 90%, at least 95%, all or all within manufacturing tolerances of the second electrode 19 may be overlapped or covered by the material 40. As the second electrode 19 may reduce transmission of light through the second support plate 6, by locating the second electrode 19 so as to not substantially overlap the display area 24, and to be overlapped by the material 40, the contrast of the electrowetting element 2 may be increased.

In examples such as that of FIG. 1, the electrowetting element 2 may include a color filter (not shown in FIG. 1). The color filter may overlap or cover the entire surface 14 or display area 24 of the electrowetting element 2 or substantially all of the display area 24, for example 90% or more of the display area 24, or the color filter may overlap a smaller portion of the display area 24 than 90%. There may be a single non-white color filter per or corresponding to each electrowetting element 2. In such cases, each electrowetting element 2 may act as a color filter of a particular color. In other examples, though, an electrowetting element may be associated with more than one non-white color filter or vice versa. For example, an electrowetting element may include a plurality of color filters each of a different color from each other, such as a red color filter, a blue color filter and a green color filter. In these examples, each color filter may be considered to correspond to a different respective sub-pixel of the electrowetting element. The color filter may be located in any suitable location within the electrowetting element 2. For example, the color filter may be a layer of the first support plate 5 or of the second support plate 6. Where the first support plate 5 includes the color filter, the color filter may be located between a reflector (such as a reflective first electrode) and the surface 14. Where the second support plate 5 includes the color filter, the color filter may be located between the material 40 and the second fluid 12 or the material 40 may be located between the color filter and the second fluid 12.

As the skilled person will appreciate, a color filter is typically one or more layers of a material which are configured to filter light incident on the filter. Indeed, a combination of layers in cross-section of an electrowetting element may together filter out light of one or many wavelengths to provide an output color effect and thereby act as a color filter. For example, the color filter may remove or filter out a portion of light entering the color filter. The light that is filtered out is for example of one or a band of many wavelengths and/or colors of light. So, a color filter generally has a degree of transparency to permit light not removed by the color filter to be transmitted through the color filter. The filtering property of a color filter depends for example on a material the color filter is formed of or includes. Examples of a material for forming the color filter include a resist material such as the JSR OPTMER™ CR series, which are pigment dispersed photo-resists.

The color filter may be a non-switchable color filter; in other words, the color filter may have a fixed shape so that a spatial configuration of the non-switchable color filter is not changeable, for example is not switchable. Thus, the non-switchable color filter may be a non-fluid color filter. This may be contrasted with for example the first fluid 11 described above, which may include a dye or pigment to act as a color filter which is switchable between different first fluid configurations. The color filter may further contribute to a display effect provided by the electrowetting element 2, in addition to a configuration of the first and second fluids 11, 12.

Figure 2:
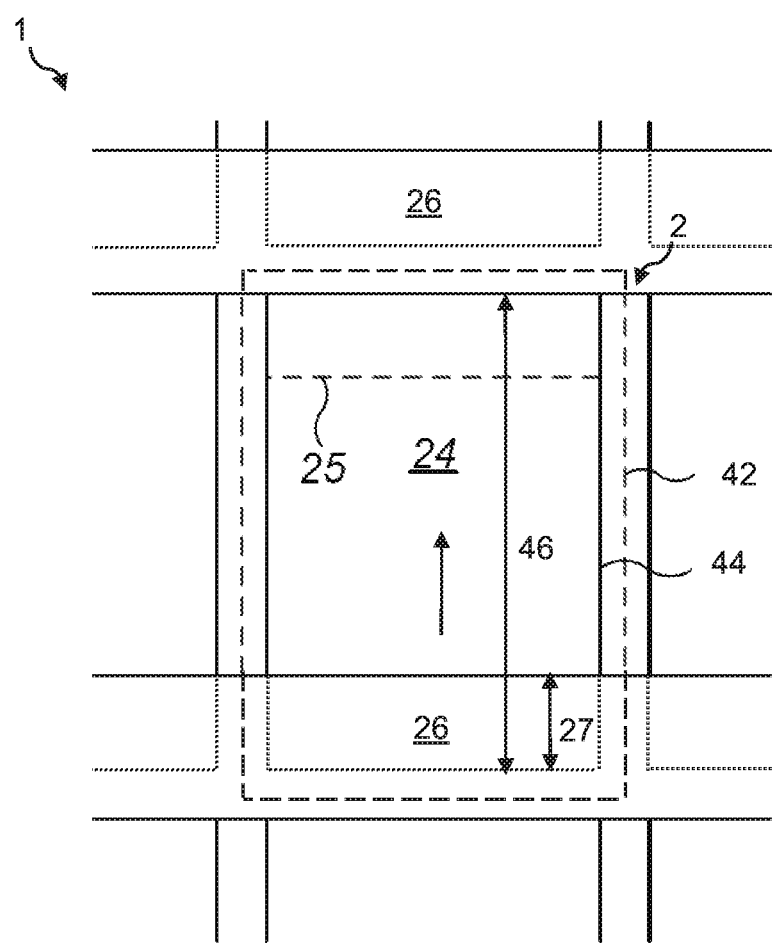
FIG. 2 shows schematically the electrowetting element of FIG. 1 in plan view.

FIG. 2 shows a plan view of part of the electrowetting display device 1 of FIG. 1, illustrating the electrowetting element 2 of FIG. 1. The electrowetting display device 1 of FIGS. 1 and 2 includes a plurality of electrowetting elements, as can be seen in FIGS. 1 and 2 in which electrowetting elements neighboring the electrowetting element 2 are partially illustrated but not labelled (for clarity). The electrowetting elements may be arranged in a matrix configuration, for example as an array or matrix of n rows and m columns, where each of n and m are integers. Each of n and m may be ≥2; the total number of electrowetting elements in this example is n×m. Each electrowetting element of the matrix may be the same as each other or some of the electrowetting elements may differ from each other.

The lateral dimension of the electrowetting element 2 in FIG. 2, corresponding to the dashed lines 3 and 4 of the electrowetting element 2 in FIG. 1, is indicated by the dashed line 42. The line 44 indicates the inner border of the walls 21 of FIG. 1; this line 44 is also the edge, for example a perimeter, of the surface 14 of the first support plate 5, which for example corresponds with the display area 24. The dashed line 25 marks the boundary between the first fluid 11 and the second fluid 12 when a voltage is applied to the electrowetting element 2 to retract the first fluid 11 against the wall 21 such that the first fluid 11 has the dashed shape 56.

The position of the protrusion 26 is also illustrated in FIG. 2. In this example, the protrusion 26 extends along one of the walls 21 so that the protrusion 26 is along an entire side of the electrowetting element 2 (in this example, a short side of the electrowetting element 2 corresponding to the width of the electrowetting element 2). With the protrusion 26 extending along a side of the electrowetting element 2 (for example along a perimeter portion of a perimeter of the surface 14 corresponding to a side of the electrowetting element 2), the first fluid 11 may retract substantially uniformly (for example uniformly within measurement uncertainties) away from the protrusion 26. In other words, the first fluid 11 may for example move or retract with a curtain-like movement, with a trailing edge of the first fluid 11, such as an edge of the first fluid 11 in contact with the second fluid 12 and the surface 14, being substantially straight (for example straight within measurement uncertainties). The trailing edge of the first fluid 11 may be parallel or substantially parallel to the side of the electrowetting element 2, for example within 10 degrees of the side of the electrowetting element 2. The trailing edge of the first fluid 11 may move perpendicularly or substantially perpendicularly with respect to the side of the electrowetting element 2, for example within 10 degrees of the side of the electrowetting element 2. In the example of FIG. 2, the trailing edge of the first fluid 11 (which coincides with the dashed line 25) is a straight line that is parallel to the wall 21 of the electrowetting element 2 that is located at the bottom of FIG. 2, and that moves perpendicularly to this wall 21 of the electrowetting element.

In this example, the protrusion 26 has the shape of a strip, stripe or band along a side of the electrowetting element 2 in plan view. In examples such as this, the protrusion 26 may therefore be elongate along all or part of a side of the electrowetting element 2 in plan view, for example along all or part of a wall 21 of the electrowetting element 2. In such cases, the protrusion 26 may therefore have a rectangular cuboid or substantially rectangular cuboid shape in three dimensions, for example a rectangular cuboid shape with one or more rounded edges or corners or with angles that are within 80 degrees and 100 degrees rather than exactly 90 degrees. In other examples, though, the protrusion 26 may not be elongate in shape in plan view. For example, the protrusion 26 may have the shape of a cube or have a substantially cube shape such as a cube shape with one or more rounded edges or corners or with one or more sides that are not exactly equal in length but are for example the same length within 10% or 20%.

However, in other examples, the protrusion 26 may have a different length or location. For example, where the electrowetting element 2 includes at least one wall corresponding to a perimeter of the surface 14, the perimeter may be considered to include a perimeter portion corresponding to a side of the electrowetting element 2. In these examples, the protrusion may extend along at least 50%, at least 60%, at least 70%, at least 80%, at least 90%, substantially all (for example all within manufacturing or measurement tolerances) or all of the perimeter portion. For example, the protrusion may extend along less than all of the perimeter. The protrusion may extend along solely one or less than all of a plurality of sides of the electrowetting element. For example, the protrusion may extend along at least 50%, at least 60%, at least 70%, at least 80%, at least 90%, substantially all, or all of a lateral side of the electrowetting element.

In examples such as FIG. 2, a first width 27 of the first surface portion overlapped by the protrusion 26 may be at least 10% of a second width 46 of the surface 14. This first width 27 for example is sufficient to cause a Laplace pressure difference at the initiation location overlapped by the protrusion 26 to cause the motion of the first fluid 11 to initiate at the initiation location. For example, a width ratio of the first width 27 to the second width 46 may meet or exceed a threshold width ratio for movement of the first fluid to initiate between the protrusion 26 and the first surface portion upon application of the second voltage. As for determining whether the distance ratio between the second distance 34 and the first distance 32 meets or is less than the threshold distance ratio, it may be determined whether the width ratio is satisfied by assessing whether protrusions 26 with a particular width ratio do consistently cause the first fluid 11 to initiate in a particular initiation location, such as between the protrusion 26 and the first surface portion. For example, with the surface 14 having a second width of around 120 micrometers, the first width of the protrusion 26 may be between 12 micrometers and 15 micrometers, although this is merely an example and other widths are possible.

Figure 3:
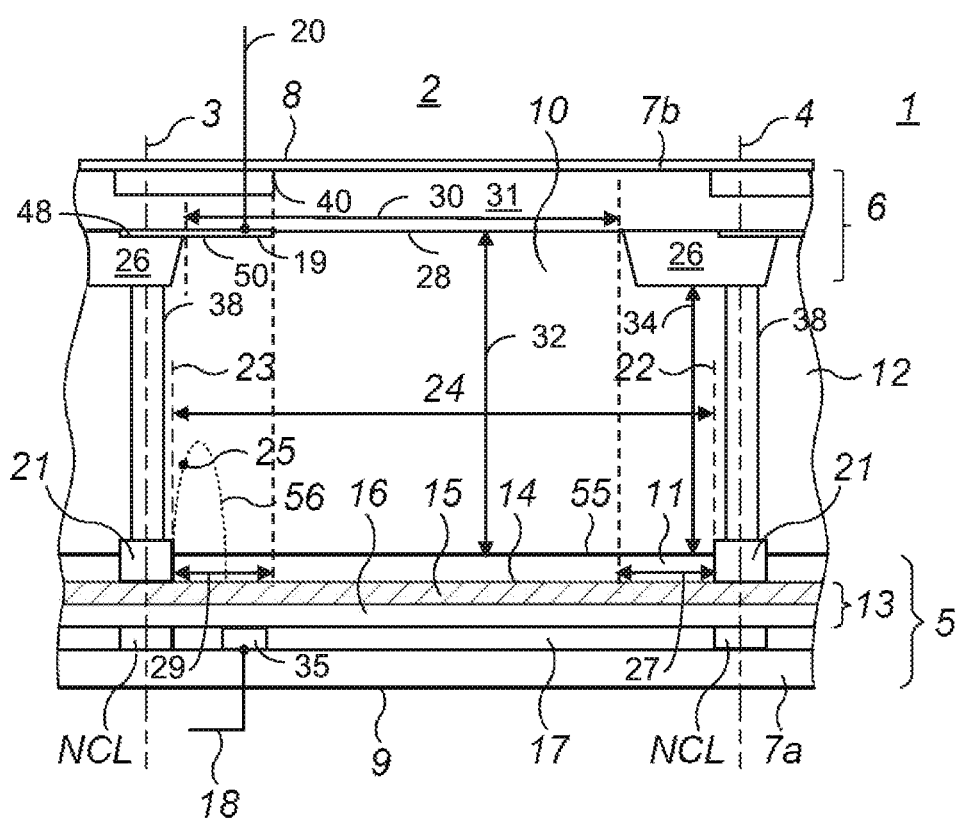
FIG. 3 shows schematically an electrowetting element in cross-section according to further examples.

FIG. 3 shows a further example of an electrowetting element 2 with a protrusion 26. The electrowetting element 2 is the same as the electrowetting element 2 of FIG. 1 except that the second electrode 19 is located at least partly between the first layer (in this example, the substrate 7b that includes the material 40) and the second layer (which corresponds to the protrusion 26 in this example). Features of FIG. 3 are labelled with the same reference numerals as corresponding features of FIG. 1; corresponding descriptions are to be taken to apply. Due to the different location of the second electrode 19 in the second support plate 6 in FIG. 3, the second electrode 19 has a first electrode surface 48 at least partly in contact with the first layer and a second electrode surface 50 opposite to the first electrode surface 48. The second electrode surface 50 is in contact with the second fluid 12. The non-planar second surface of the second support plate 6 therefore includes the second electrode surface 50.

Figure 4:
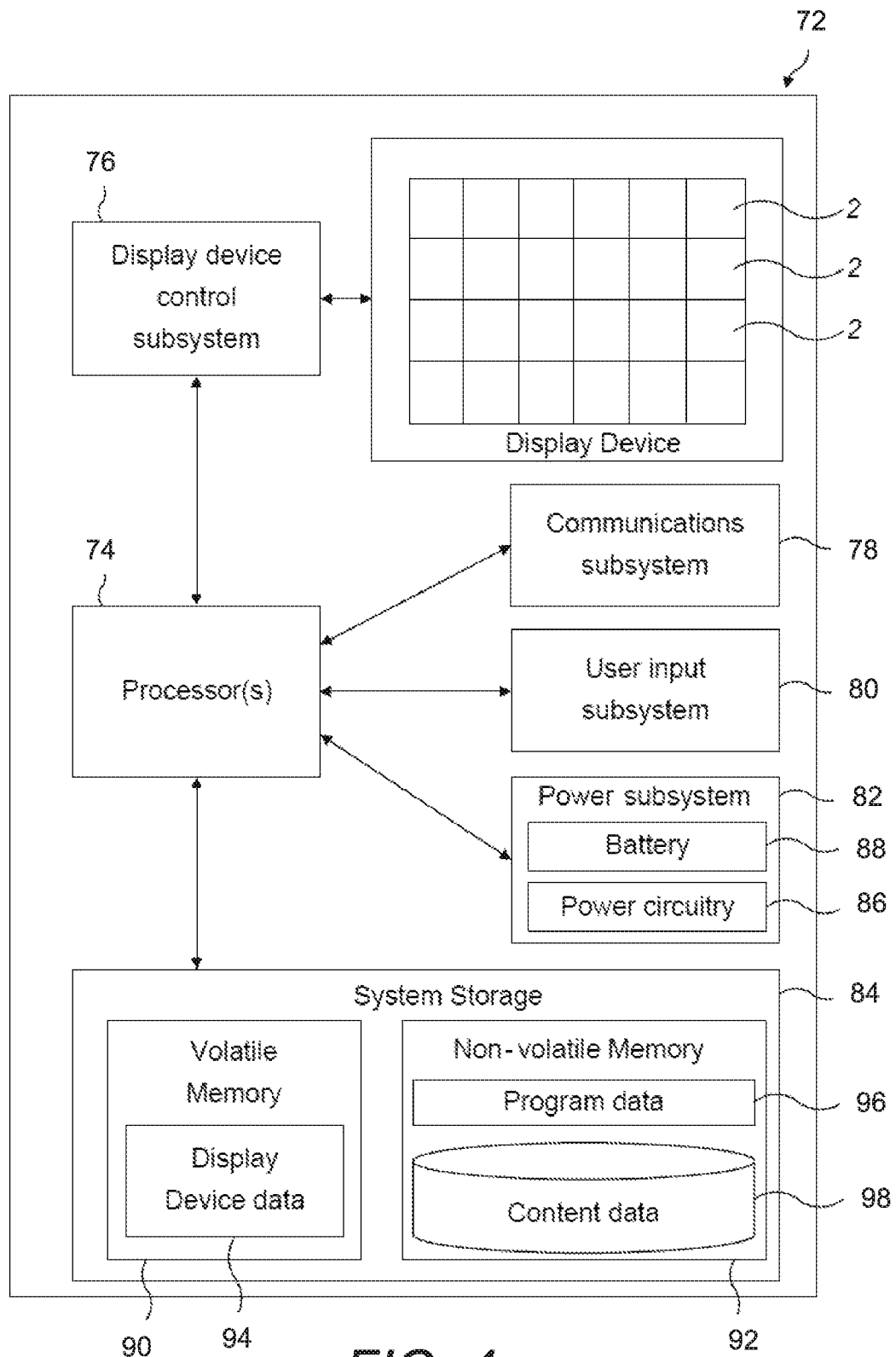
FIG. 4 shows a schematic system diagram of an example apparatus including an electrowetting display device.

FIG. 4 shows schematically a system diagram of an example system, for example an apparatus 72, including an electrowetting display device, an electrowetting element, an electrowetting display unit, or an array of electrowetting elements such as any of the examples described above. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 72. The apparatus 72 includes at least one processor 74 connected to and therefore in data communication with for example: a display device control subsystem 76, which for example may be or include circuitry for controlling the electrowetting display device, a communications subsystem 78, a user input subsystem 80, a power subsystem 82 and system storage 84. The display device control subsystem is connected to and is therefore in data communication with the electrowetting display device. The at least one processor 74 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 84. The at least one processor may additionally, or in the alternative, contain memory, such as processor registers.

The display device control subsystem 76 for example includes electrowetting display element driver components, for use in applying a voltage to any of the electrowetting elements, to address different such display elements. In examples the electrowetting elements are configured according to an active matrix configuration and the display device control subsystem is configured to control switchable elements such as thin film transistors (TFTs) of the apparatus 72 via circuitry to control the electrowetting display elements. The circuitry may include signal and control lines, as the skilled person will appreciate.

The communications subsystem 78 for example is configured for the apparatus to communicate with for example a computing device via a data network, for example a computer network such as the Internet, a local area network, a wide area network, a telecommunications network, a wired network, a wireless network, or some other type of network. The communications subsystem 78 may further for example include an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 80 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 82 for example includes power circuitry 86 for use in transferring and controlling power consumed by the apparatus. The power may be provided by a mains electricity supply or from a battery 88, via the power circuitry. The power circuitry may further be used for charging the battery from a mains electricity supply.

The system storage 84 includes at least one memory, for example at least one of volatile memory 90 and non-volatile memory 92 and may include a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect or grey level provided by the electrowetting display device.

In the example of FIG. 4, the volatile memory 90 stores for example display device data 94 which is indicative of display effects or grey levels to be provided by the electrowetting display device. The at least one processor 74 may transmit data, based on the display device data, to the display device control subsystem 76 which in turn outputs signals to the electrowetting display device for applying voltages to the electrowetting elements, for providing display effects or grey levels from the electrowetting display device.

The non-volatile memory 92 stores for example program data 96 and/or content data 98. The program data 96 is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data 98 is for example data representing content for example for a user; such content may represent any form of media, for example text, at least one image or a part thereof, at least one video or a part thereof, at least one sound or music or a part thereof. Data representing an image or a part thereof is for example representative of a display effect or grey level to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative examples. Further examples are envisaged. For example, although the examples described above include a spacer located between the protrusion and the wall of an electrowetting element, in other examples spacers may be omitted or the arrangement of the spacers may be different from that described above.

It is noted that the shape and position of the protrusion described above are merely illustrative examples. Other shapes or positions are possible in other examples. For example, the shape and position of the protrusion may be selected appropriately to obtain a desired initiation or control of motion of the first fluid. For example, although FIGS. 1 and 3 show the protrusion 26 as having sloped edges with respect to the vertical, in some examples the edges of the protrusion 26 may not be sloped. For example, as noted above, the protrusion may have a cuboid shape, with each interior angle being 90 degrees or 90 degrees within manufacturing tolerances.

The description above refers to a control system configured to or at least one memory and computer program instructions configured to, with at least one processor, apply voltages to an electrowetting element. It is to be appreciated that application of such voltages may involve determining a voltage with a particular magnitude, generating the voltage with the particular magnitude and transmitting the voltage with the particular magnitude to the electrowetting element for application. For example, the at least one memory and the computer program instructions, with the at least one processor, may determine the magnitude of the voltage and then control the control system to output the voltage.

Figure 5A:
FIGS. 5a to 5f show schematically a cross-section of a second support plate at various stages during manufacture according to examples.
Figure 5B:
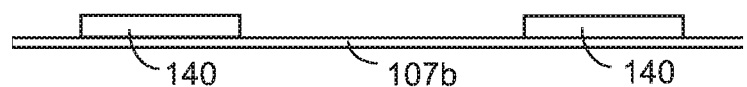
Figure 5C:
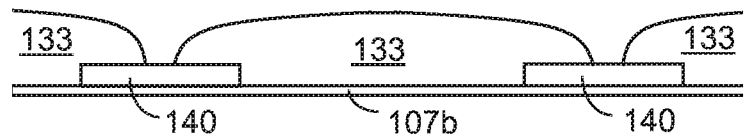
Figure 5D:
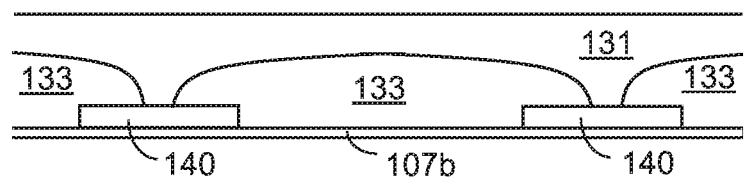
Figure 5E:
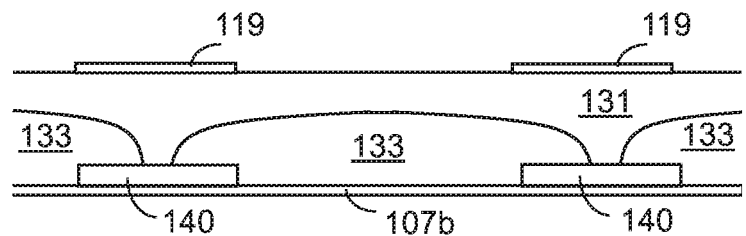
Figure 5F:
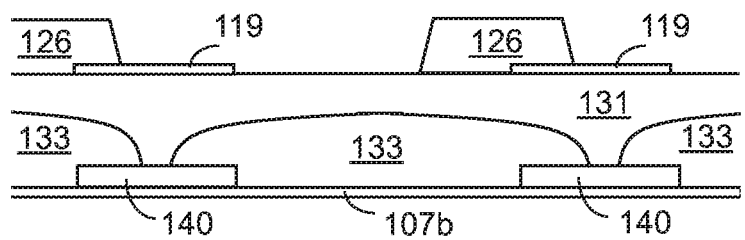

Examples of manufacturing a second support plate such as that described above are shown schematically in FIGS. 5a to 5f. Features of FIGS. 5a to 5f illustrated in FIGS. 1 to 4 are labelled with the same reference numerals but incremented by 100. Corresponding descriptions are to be taken to apply. In FIG. 5a, a substrate 107b is provided. In FIG. 5b, the material 140 is provided on the substrate 107b. The material 140 may for example be deposited to cover the substrate 107b and subsequently patterned, for example using photolithography, to form the appropriate pattern of the material 140. In FIG. 5c, a color filter 133 is provided on the material 140. Similarly to the providing of the material 140, the color filter 133 may be deposited as a layer to cover the material 140 and the exposed surface of the substrate 107b (for example the surface of the substrate 107b not in contact with the material 140), and subsequently patterned to form the pattern shown in FIG. 5c. As explained above, though, in other examples, the color filter may be located in a different position in the second support plate or may be omitted. In FIG. 5d, the layer 131, which is for example a cover layer, is provided to cover the color filter 133 and the exposed portion of the material 140. In FIG. 5e, the second electrode 119 is provided on the layer 131 to form a second support plate with a similar structure to the second support plate 6 illustrated in FIG. 3. Subsequently, a protrusion material is provided on the second electrode. The protrusion material may be patterned to form the protrusion 126. The patterning may be performed using photolithography using a suitable photoresist material. In other examples, such as the example of FIG. 1, the second electrode 119 may be provided on the protrusion 126 rather than providing the protrusion on the second electrode 119. Subsequently, a spacer may be provided on the protrusion 126 using a further photolithography process for example. Alternatively, the protrusion and the spacer may be provided integrally, for example using a single or combined photolithography process. In further examples, a spacer may be provided as part of the first support plate and subsequently aligned to contact a portion of the second support plate including the protrusion 126, or the electrowetting display device may not include a spacer. After manufacturing the second support plate, the second support plate may be inverted or rotated to the orientation illustrated in FIGS. 1 and 3.

The second support plate may be assembled with a pre-manufactured first support plate to produce one or more electrowetting elements by attaching the first and second support plates together, for example using an adhesive seal at a perimeter of an array of the electrowetting elements after having provided the first and second fluids between the first and second support plates.

A plurality of electrowetting elements of an electrowetting display device may each have a protrusion located in the same respective location in each electrowetting element, such as the protrusion 26 described above. The protrusion may therefore be used to control the motion of the first fluid so that the first fluid moves in the same direction or the same direction within acceptable operational tolerances within each respective electrowetting element, upon application of a non-zero voltage. With the first fluid moving in the same or a similar direction in a plurality of electrowetting elements, the appearance of visible display artifacts that may degrade the viewing experience for a viewer of the electrowetting display device may be reduced.

In the description above, the labels "first", "second", "third" and "fourth" are used merely for convenience and do not necessarily suggest that further instances of a particular feature are present. For example, reference in an example to a second element does not necessarily imply that a first, third and/or fourth element is also present.

Further examples are envisaged, which include combinations of features of the originally filed claims, as indicated in the following table, which lists various envisaged claim dependencies for the claims originally filed with this application. Hence, in addition to the description above, this table gives basis in the specification for general examples having a combination of features of claims filed herewith:

| Claim as Originally Filed | Envisioned Claim Dependencies |
| --- | --- |
| 1 | — |
| 2 | 1 |
| 3 | 1, 2 |
| 4 | Any of claims 1 to 3 |
| 5 | Any of claims 1 to 4 |
| 6 | Any of claims 1 to 5 |
| 7 | Any of claims 1 to 6 |
| 8 | Any of claims 1 to 7 |
| 9 | Any of claims 1 to 8 |
| 10 | — |
| 11 | 10 |
| 12 | 10, 11 |
| 13 | Any of claims 10 to 12 |
| 14 | Any of claims 10 to 13 |
| 15 | Any of claims 10 to 14 |
| 16 | Any of claims 10 to 15 |
| 17 | — |
| 18 | 17 |
| 19 | 17, 18 |
| 20 | Any of claims 17 to 19 |

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting display device comprising:
a first support plate;
a first electrowetting element comprising:
   a first fluid;
   a second fluid immiscible with the first fluid;
   a first electrode of the first support plate; and
   a first surface of the first support plate;
a second electrode;
a wall which at least partly surrounds the first surface;
a second electrowetting element neighboring the first electrowetting element, the second electrowetting element comprising a second surface of the first support plate; and
a second support plate comprising:
   a protrusion which overlaps more of the first surface than the second surface, the protrusion overlapping at least part of the wall such that a first axis which passes through a center of the protrusion in a direction perpendicular to the first surface is spaced from a second axis which passes through a center of the wall in the direction perpendicular to the first surface,
the first fluid and the second fluid located between the first support plate and the second support plate,
wherein upon application of a voltage with a non-zero magnitude between the first electrode and the second electrode, the first fluid moves such that there is substantially no contact between the first fluid and a first surface portion of the first surface overlapped by the protrusion.

2. The electrowetting display device according to claim 1, wherein the protrusion comprises a material with a first refractive index equal to or less than 10% different from a second refractive index of the second fluid.

3. The electrowetting display device according to claim 1, wherein:
a second support plate surface of a second support plate portion of the second support plate free from the protrusion is located at a first distance, in a first direction perpendicular to the first surface, from the first surface;
a third surface of the protrusion closest to the first surface is located at a second distance, in a second direction perpendicular to the first surface, from the first surface; and
a distance ratio between the second distance and the first distance meets or is less than a threshold distance ratio for movement of the first fluid to initiate between the protrusion and the first surface portion upon the application of the voltage.

4. The electrowetting element according to claim 3, wherein the second distance is 50% of the first distance or less than 50% of the first distance.

5. The electrowetting display device according to claim 1, wherein the protrusion extends along at least 50%, at least 60%, at least 70%, at least 80%, at least 90%, substantially all, or all of a lateral side of the electrowetting element.

6. The electrowetting display device according to claim 1, wherein a width ratio of a first width of the first surface portion to a second width of the first surface meets or exceeds a threshold width ratio for movement of the first fluid to initiate between the protrusion and the first surface portion upon the application of the voltage.

7. The electrowetting display device according to claim 1, wherein, with the non-zero voltage applied between the first electrode and the second electrode:
   there is a first pressure difference between a first portion of the first fluid and a second portion of the second fluid in contact with the first portion of the first fluid, the first portion of the first fluid and the second portion of the second fluid located between the first support plate and the protrusion; and
   there is a second pressure difference between a third portion of the first fluid and a fourth portion of the second fluid in contact with the third portion of the first fluid, the third portion of the first fluid and the fourth portion of the second fluid located between the first support plate and a second support plate portion of the second support plate free from the protrusion,
   a first magnitude of the first pressure difference larger than a second magnitude of the second pressure difference.

8. The electrowetting display device according to claim 1, wherein, with the non-zero voltage applied between the first electrode and the second electrode:
   a second portion of the second fluid between a first portion of the first fluid and the protrusion has a first height in a first direction perpendicular to the first surface; and
   a fourth portion of the second fluid between a third portion of the first fluid and a second support plate portion of the second support plate free from the protrusion has a second height, larger than the first height, in a second direction perpendicular to the first surface.

9. The electrowetting display device according to claim 1, comprising:
   a spacer between the protrusion and the wall,
   a first width of the spacer in a first direction parallel to the first surface less than a second width of the protrusion in a second direction parallel to the first direction.

10. The electrowetting display device according to claim 1, wherein the protrusion overlaps the first surface portion of the first surface without substantially overlapping the second surface.

11. The electrowetting display device according to claim 1, wherein the second support plate comprises a material which overlaps a second surface portion of the first surface, different from the first surface portion, the material configured to substantially prevent at least a portion of light of at least one wavelength in the visible spectrum from transmission through the material.

12. An electrowetting element comprising:
   a first fluid;
   a second fluid immiscible with the first fluid;
   a first support plate comprising:
      a first electrode; and
      a first surface;
   a second electrode in contact with the second fluid; and
   a second support plate comprising:
      a first layer with an extent which overlaps a first surface portion of the first surface, the first surface portion less than all of the first surface, the first layer substantially transmissive to light of at least one wavelength in the visible spectrum; and
      a second layer comprising a material which overlaps a second surface portion of the first surface, different from the first surface portion, the material configured to substantially prevent at least a portion of light of the at least one wavelength in the visible spectrum from transmission through the material,
   wherein the first layer is closer to the first surface than the second layer such that the second support plate has a non-planar second surface which overlaps the first surface, and
   wherein the second electrode at least one of:
      is located at least partly between the first layer and the second layer; or
      comprises a first electrode surface at least partly in contact with the first layer and a second electrode surface opposite to the first electrode surface, the second electrode surface in contact with the second fluid, the non-planar second surface comprising the second electrode surface,
   the first fluid and the second fluid located between the first support plate and the second support plate,
   wherein the first fluid is switchable between:
      a first configuration with the first fluid in contact with the first surface portion, with a first voltage applied between the first electrode and the second electrode, the first voltage having a substantially zero magnitude; and
      a second configuration substantially without the first fluid in contact with the first surface portion and with the first fluid at least partly overlapped by the material, with a second voltage applied between the first electrode and the second electrode, the second voltage having a non-zero magnitude.

13. The electrowetting element according to claim 12, wherein, upon application of the second voltage between the first electrode and the second electrode, the first fluid moves such that there is substantially no contact between the first fluid and the first surface portion.

14. The electrowetting element according to claim 12, wherein the second electrode is substantially entirely overlapped by the material.

15. The electrowetting element according to claim 12, wherein the material is a second material and the first layer comprises a first material with a first refractive index equal to or less than 10% different from a second refractive index of the second fluid.

16. The electrowetting element according to claim 12, wherein the first support plate comprises a transistor and the material overlaps at least part of the transistor.

17. An electrowetting element comprising:
   a first fluid;
   a second fluid immiscible with the first fluid;
   a first support plate comprising:
      a first electrode; and
      a first surface;
   a second electrode in contact with the second fluid; and a second support plate comprising:
- a first layer with an extent which overlaps a first surface portion of the first surface, the first surface portion less than all of the first surface, the first layer substantially transmissive to light of at least one wavelength in the visible spectrum; and
- a second layer comprising a material which overlaps a second surface portion of the first surface, different from the first surface portion, the material configured to substantially prevent at least a portion of light of the at least one wavelength in the visible spectrum from transmission through the material,
- wherein the first layer is closer to the first surface than the second layer such that the second support plate has a non-planar second surface which overlaps the first surface, and wherein the second electrode is substantially entirely overlapped by the material,
- the first fluid and the second fluid located between the first support plate and the second support plate,
wherein the first fluid is switchable between:
- a first configuration with the first fluid in contact with the first surface portion, with a first voltage applied between the first electrode and the second electrode, the first voltage having a substantially zero magnitude; and
- a second configuration substantially without the first fluid in contact with the first surface portion and with the first fluid at least partly overlapped by the material, with a second voltage applied between the first electrode and the second electrode, the second voltage having a non-zero magnitude.

18. The electrowetting element according to claim 17, wherein, upon application of the second voltage between the first electrode and the second electrode, the first fluid moves such that there is substantially no contact between the first fluid and the first surface portion.

19. The electrowetting element according to claim 17, wherein the material is a second material and the first layer comprises a first material with a first refractive index equal to or less than 10% different from a second refractive index of the second fluid.

20. The electrowetting element according to claim 17, wherein the first support plate comprises a transistor and the material overlaps at least part of the transistor.

* * * * *